May 22, 1956  J. G. ROSS  2,746,698

HAND CONTROL FOR STEERING AIRCRAFT ON LAND OR IN AIR

Filed Oct. 8, 1952  3 Sheets—Sheet 1

Jewel G. Ross,
INVENTOR,

BY Bruninga and Sutherland,
ATTORNEYS.

May 22, 1956
J. G. ROSS
2,746,698
HAND CONTROL FOR STEERING AIRCRAFT ON LAND OR IN AIR
Filed Oct. 8, 1952
3 Sheets-Sheet 2
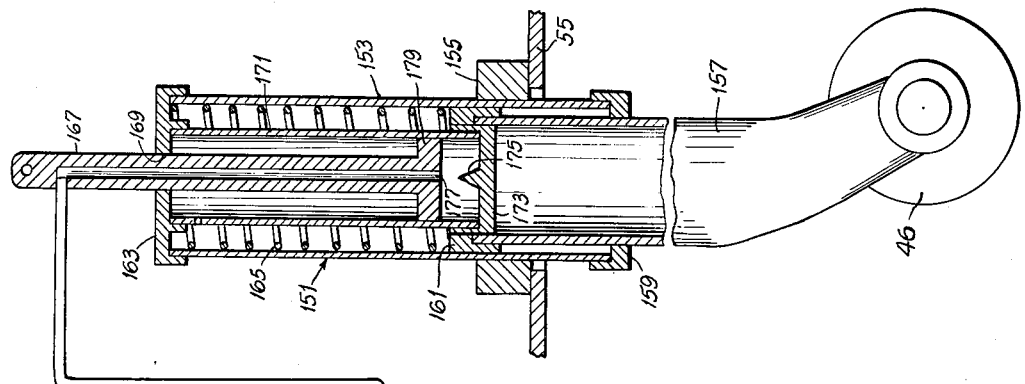
Jewel G. Ross,
INVENTOR.
BY Bruninga and Sutherland,
ATTORNEYS.

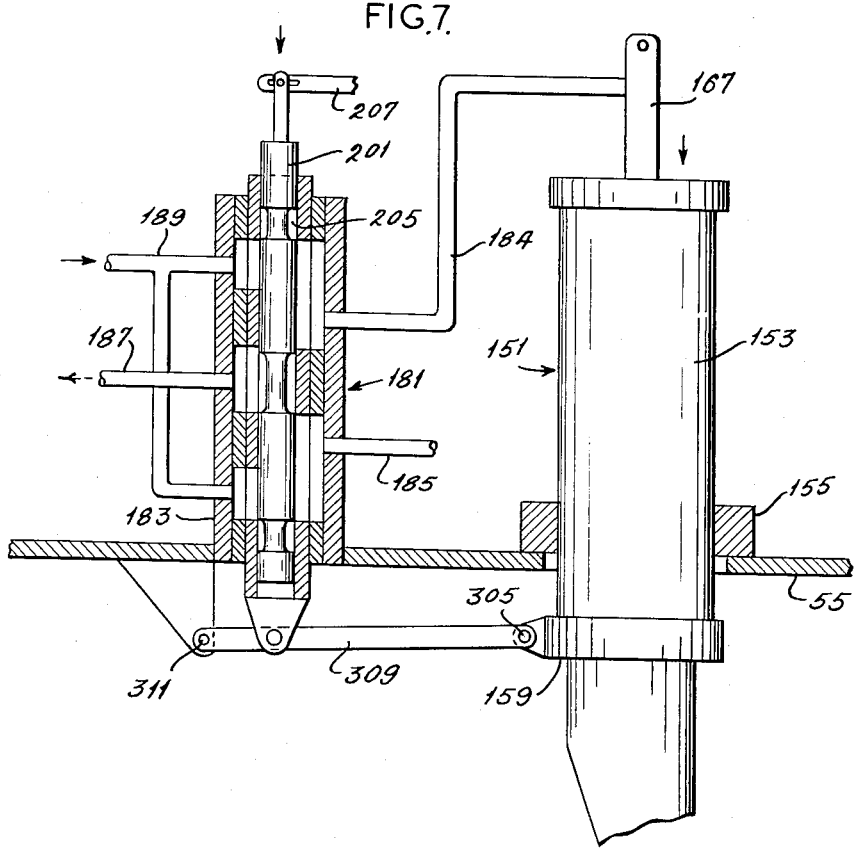

United States Patent Office 2,746,698
Patented May 22, 1956

2,746,698
HAND CONTROL FOR STEERING AIRCRAFT ON LAND OR IN AIR

Jewel G. Ross, Iron Mountain, Mo.

Application October 8, 1952, Serial No. 313,764

24 Claims. (Cl. 244—50)

This invention relates generally to vehicles, and particularly to the hand controls and undercarriages of aircraft, although to the extent that the problems there encountered are common to other vehicles, the scope of the invention is broader.

It is recognized by those skilled in the art that the conventional aircraft control arrangement of rudder-actuating foot pedals and an aileron-actuating hand wheel is not entirely satisfactory, particularly from the viewpoint of a beginner. Not only is it difficult to learn the proper foot and hand coordination necessary for successful maneuvering, but the arrangement itself is inherently dangerous. It has accordingly been proposed that the foot pedals be eliminated, by using the hand wheel to operate the aileron and rudder in mechanically coordinated relationship; this being possible because the primary function of the rudder is to overcome the induced yaw occurring when the ailerons are manipulated. There are certain maneuvers, however, such as cross-wind landings or turns at reduced speed, when the built-in mechanical coordination does not produce the proper rudder action. It has therefore been suggested that the mechanical coordination between the rudder and ailerons should be made variable and placed under the control of an adjusting lever mounted adjacent the hand wheel, but this arrangement is ill suited for convenient manipulation during piloting.

It is accordingly an object of the invention to provide for independent hand-controlled variation of the three variables (steering, pitching and rolling), and to accomplish this by a control that may be naturally, conveniently and quickly manipulated with one hand. To this end, a primary wheel is provided with a second control element, which is rotatably attached to the primary wheel in axially offset relationship. This second control element has a handle, by means of which the primary wheel may be turned (lateral movement of the handle), and by which the secondary control element may be rotated independently of the primary wheel (twist of the handle). As such, the second rotary member may be geared or otherwise coupled to a control shaft arranged concentric with the axis of rotation of the primary wheel, and both may be coupled together for certain maneuvers.

While I prefer generally to use the main control wheel for directional control and the secondary control element for lateral tilt control or roll, it will be apparent that they may be interchanged if desired without departing from the basic principle of operation. For example, the primary wheel is rigged so that its fore and aft movement controls the elevators and pitch of an airplane in the usual manner, but its rotary movement is caused to actuate the rudder and turn the airplane on its vertical axis. The ailerons are then coupled independently to the second control element so that the vehicle is rolled on its longitudinal axis by twisting of this element.

It will be understood that the control device may be applied to other types of vehicles, including automotive vehicles, boats and helicopters. It is also apparent that there are many possible arrangements known in the art which may be used in particular applications to transmit control forces from my control device to the control gear of the vehicle.

The preferred arrangement should greatly simplify the task of learning to handle the three control actions of aircraft, or of other vehicles having similar controls. The average person from his experience with automobiles is already familiar with the use of a wheel to control steering. Proper control of lateral and longitudinal tilt is easily acquired inasmuch as it is instinctive for one to twist the hand to a proper bank and to pitch the vehicle by fore and aft movement of the hand. Moreover, the feet can be more conveniently put to use in actuating wheel brakes, air flaps (analogous to brakes), the rotor pitch of a helicopter and perhaps a throttle, although as a general rule a hand throttle should also be provided in aircraft. It is further contemplated there may be foot control for the trim and flaps of aircraft, which should afford complete control over the glide angle or glide path for extremely accurate landings.

In addition to the above, the invention also contemplates the provision of an improved undercarriage or suspension system for automotive vehicles, airplanes, helicopters, and combinations thereof.

To absorb the shock of landing an airplane, a soft suspension system is required. Furthermore, it is frequently desirable to have castering wheels on the landing gear, in order to facilitate cross-wind landings. For the running gear of an automobile, however, these features are not too satisfactory. An automotive suspension is designed to absorb frequently recurring small-amplitude shocks rather than the infrequent large-amplitude deflections for which landing gear is designed, and freely castering wheels, of course, does not generally lend themselves to automotive use. Also, a softly sprung suspension in an automobile results in excessive sway during high-speed turns. It is accordingly an object of this invention to provide a suspension which is well adapted for both automotive and aircraft use.

To this end, I provide an undercarriage having a pair of tandem wheels, the forward wheel being mounted for steering and the rear wheel constituting a drive wheel. Additionally, there are freely castering side wheels, one on each side at approximately the longitudinal center of gravity. In operation, the side wheels function as landing wheels of an airplane and as outrigger balancing wheels for road travel.

Three of these four wheels may be provided with extension and retraction mechanism. In operation, the side wheels are retracted and advanced in opposite directions when the controls are moved as for a bank in flight, so that the body tilts in the same direction. When entering a turn on the highway, if the controls are moved in the same manner as in flight, the machine will bank into the turn, which, when properly executed, will considerably increase safety and comfort during a high-speed turn.

In similar fashion, the front wheel is connected to the longitudinal control so that the body tilts as the wheel is advanced or retracted. Nosing the body down shifts a larger proportion of the weight to the side wheels as compared with a nose-raised condition, thereby increasing the sensitivity of bank control and providing a smoother ride over rough roads.

An additional advantage of this type of undercarriage is the similarity of the control action for driving and flying. It is foreseen that this might facilitate learning to fly without leaving the ground, and certainly will create a familiarity with control operation not presently attainable. In such event, it is preferable to arrange the tilting mechanism so that response to the controls on the ground conforms as nearly as possible to the response to the controls in the air. When the vehicle is banked, it should remain banked after control is neutralized, so that opposite control would have to be applied to return the vehicle to level. The attitude longitudinally should follow the fore and aft movement of the control wheel assuming a relative position to that of the hand wheel. It is contemplated, however, that in some applications the lateral tilt would follow the control so that the vehicle returns to a level condition as the bank control wheel is returned to neutral position.

Other features of the invention will be in part apparent from and in part pointed out in the following detail description taken in connection with the accompanying drawings, in which:

Fig. 5 is a vertical sectional view illustrating details of the front wheel assembly and control valve therefor;

Fig. 6 is a vertical section illustrating details of a side wheel assembly and a control valve therefor; and Fig. 7 is a view similar to Fig. 6, but showing an alternative embodiment of the invention.

Figure 1:
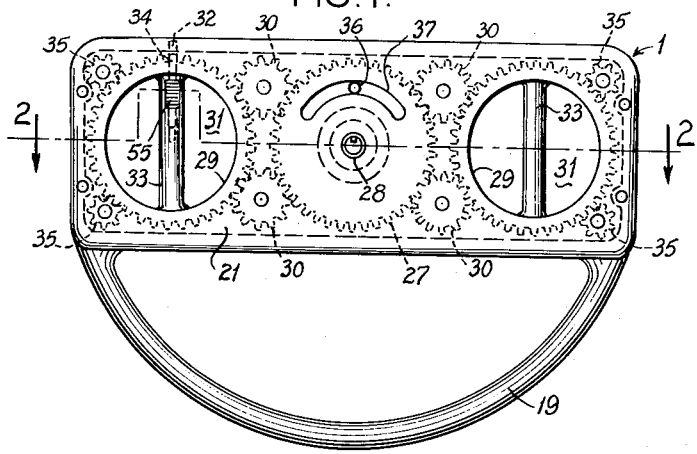
Fig. 1 is a front view of a control wheel incorporating features of this invention.
Figure 2:
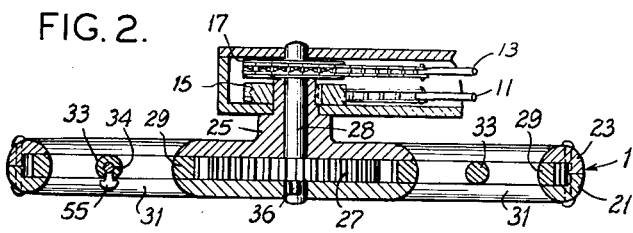
Fig. 2 is a vertical sectional view taken generally on the line 2—2 of Fig. 1.
Figure 3:
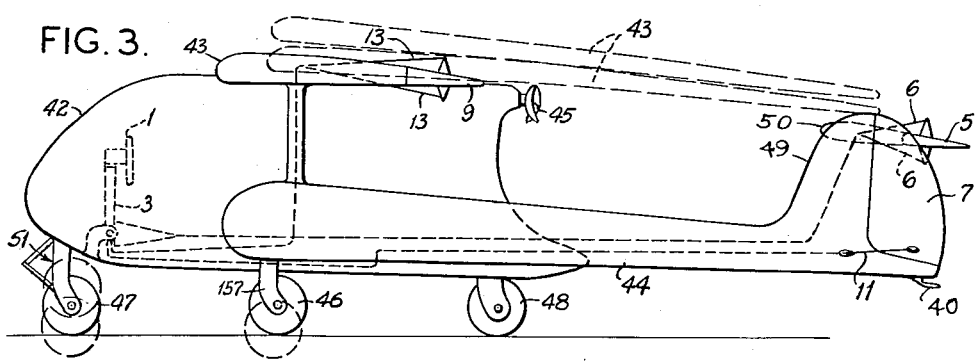
Fig. 3 is a side elevational view of a convertible automotive-airplane.

Referring now to the drawings, Figs. 1 and 2 illustrate a hand wheel 1 incorporating features of this invention. This wheel might be employed, for example, as the control wheel of an airplane, such as is shown in Fig. 3. It is to be understood the airplane has a customary tiller 3, which may be swung fore and aft to move the elevator 5, as by means of cables 6, and thereby change the longitudinal tilt. Rearward movement of the tiller results in a nose-up attitude and vice versa. A rudder 7 and ailerons 9 are also controlled, as by a cable system, the details of which are known in the art. As shown in Fig. 2, a rudder cable 11 and the aileron cable 13 are carried up into the tiller 3 and joined to chains, which are there trained about sprockets 15 and 17, respectively. The hand wheel 1 is mounted upon the tiller and controls these sprocket wheels.

The frame of this wheel is open at the bottom 19, so that it may be readily gripped, and the top is enclosed by front and rear sections 21 and 23. A hub 25 extending from the rear section 23 is rotatably received in the tiller, where it is fastened to the sprocket 15. Accordingly, the rudder is moved to change the horizontal angle of the vehicle by turning the wheel 1 upon its axis.

The lateral tilt-control is herein shown as rotary-handle elements contained within the frame of the hand wheel. A central rotary gear 27 is fixed upon a shaft 28 arranged concentric with the axis of the wheel 1, and the shaft is carried through the hub 25 to the rear part of the tiller where it is attached to the sprocket 17. The gear 27 is freely rotatable between but axially restrained by the sections 21 and 23 of the frame. Offset from the center axis, I provide a pair of rotary handles in the form of coplanar wheels 29, one on each side of the main gear 27. These secondary wheels are marginally restrained against axial movement by a marginal overlap with the frame, but they are otherwise accessible through openings 31 in the frame. Grip-forming cross arms 33 extend diametrically across the otherwise open wheels as handles. By means of these offset handles, the primary wheel may be rotated or axially displaced.

The secondary wheels, which have a gear-like periphery, are not coupled directly to the main gear 27, but instead are connected thereto through interposed idler pinions 30. The latter mesh with the main gear 27 and the outer margins of the secondary wheels 29. Additional pinions 35 are located outwardly of the secondary wheels, and together with the pinions 30, they support the secondary wheels against lateral displacement. The pinions 30 and 35 are journaled in the frame, and axial movement of the various gear parts is prevented by enclosing them within the frame. Of course, other arrangements are possible. For example, the idler pinions 35 might be omitted, and the gear members 29 may be shouldered and journaled on ball bearings carried within races on the inside of the frame.

It should be understood that other arrangements can be used without departing from the scope of this invention. For example, the rotary handle elements 29 may comprise conventional gears enclosed by the frame and axially connected handles, projecting from the front of the wheel. Also, the coupling between the handle elements 29 and the shaft 28 need not be by gears, but the shaft 28 should rotate in the same direction as the handle elements 29.

In the case of vehicles broadly, fore and aft manipulation of the control device causes the vehicle to pitch on its transverse axis; or speaking aerodynamically, to change the angle of attack in the usual manner. When it is desired to change the horizontal direction of the vehicle, the primary wheel 1 is rotated, as in an automobile, and the shaft 28 is also rotated in the same direction to provide the proper bank. When the rotary handle members 29 are locked to the primary wheel 1, as by a control lock 34, then the sprockets 15 and 17 rotate together, and I contemplate that the controls of aircraft will be so set up as to provide the proper banked turn under average conditions with the wheels so locked. The lock 34 is a pin slidably mounted within one of the handles 33 which pin may be advanced into a cooperating recess 32 in the frame to lock the elements, or it may be retracted into the handle to unlock the elements. A thumb knob 55 projects from the front of the handle to manipulate the lock.

In addition to or as a substitute for the latch 34, there may be a lost-motion connection comprising a stop 36 carried by the gear member 27 within an arcuate slot 37 in the housing. Other types of lost-motion connection between the shaft 28 and the primary wheel 1, which would tend to couple them together yet permit over-riding control at the secondary elements 29 are apparent. It will also be understood that the reaction between the primary and secondary wheels may be reduced, if necessary, by power boosters interposed between the control device and the control surfaces in a manner known in the art.

In the case of aircraft, a turn is effected by producing a banked condition. The ailerons do not produce the turn but merely produce the bank, and the rudder merely serves to kill the yaw induced by manipulation of the ailerons. Hence for average conditions, the ailerons and rudder may be mechanically coordinated as accomplished by this control device so that a proper turn is produced.

There are conditions, however, as in slow turns or in cross winds, when variable or cross control is desired. With the control device herein disclosed, the lock 34 is then retracted and the elements 29 are turned relative to the primary wheel to provide the additional correction necessary. In the case of a slow turn, the rudder is moved a little further than normal, and in the case of cross-wind landings, the ship is banked to produce a side-slip effect which overcomes lateral drift while at the same time the rudder is moved in an opposite direction in order to counteract the turning effect of the bank. The primary wheel of course is turned by lateral displacement of the hand and secondary elements 29 are rotated independently by twisting of the hand.

In further facilitating the task of learning to operate aircraft, I contemplate the provision of a body-tilting undercarriage for surface travel, which will familiarize the student pilot with flight controls during pre-flight training.

The undercarriage herein disclosed, however, has other important advantages. It is particularly suited for aircraft of a type that may be converted for road travel, such a vehicle having presented serious problems in the past. For example, wheels that are best suited for surface travel are generally unsuited for landing gear on aircraft. Also, there is the problem of maintaining stability when on the road, it being understood that aircraft must be lightweight and generally top-heavy, particularly if the wings are folded back and carried over the body (this being their most convenient location for surface travel). The arrangement herein described permits liberal shifting of the weight on or within the vehicle while maintaining ground stability; the frame structure is simple; and the components are lighweight and combine both automotive and aircraft functions.

It will further be observed that certain features of the undercarriage are useful in aircraft from the point of view of take-offs and landings, apart from other considerations. One of the dangers in landing is that as speed decreases, aerodynamic control fades, yet the vehicle remains noticeably buoyant and difficult to control on the ground. With the use of this invention, not only is there positive directional control over the ground, but ground control over the angle of attack and lateral tilt is also possible. Narrower landing strips are possible because the vehicle may be directed to the strip with less concern over the flight attitude or ground stability, the pilot knowing that he has positive and safe recovery of equilibrium after touch-down to hold on path as the aerodynamic control fades.

Moreover, certain features of the undercarriage are useful in automotive vehicles per se, particularly sporting cars.

Figure 4:
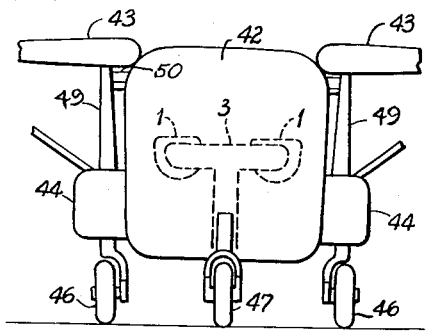
Fig. 4 is a front elevational view of the vehicle shown in Fig. 3.

Referring now to Figs. 3 and 4, there is shown a roadable airplane incorporating the undercarriage of this invention. The vehicle comprises a cabin or body 42 having wings 43 normally extended laterally but foldable back in overlapping relationship (as indicated by dotted lines) for road travel. Twin booms 44 extend rearwardly from opposite sides of the body and carry the tail surfaces, which include a pair of vertical fins 49 to which the rudders 7 are attached and an interposed horizontal fin 50 carrying the elevator 5. A pusher propeller 45 is mounted at the rear of the cabin generally between the booms 44, and the engine (not shown) is located within the cabin. A tail skid 40 is also shown.

To support the vehicle when on ground, there are two side wheels 46 located generally below the boom 44 on or adjacent the transverse axis of the vehicle, and front and rear tandem wheels beneath the body on the longitudinal axis. These wheels are supported upon resilient shock absorbers, the tandem wheels having a short stiff action of the automotive type and the side wheels having a relatively long soft stroke of aircraft landing gear. The nose wheel 47 is made steerable; the side wheels 46 are freely castering; and the tail wheel 48 is a relatively non-pivoting drive wheel. It will be understood that the engine is connected through a suitable coupling and transmission to supply power to the tail wheel, and that while the drive connection is not shown, suitable devices for such purposes are known in the automotive art.

Although this arrangement represents an improvement in roadability over conventional landing gear (two wheels forward of the transverse axis and a castering tail wheel or tricycle gear (two wheels aft of the transverse axis and a castering nose wheel), I contemplate the additional improvements of mounting the side wheels 46 upon jacks so that they may be extended and retracted (dotted lines of Fig. 3) to balance and bank the vehicle. Also, the front wheel 47 is supported upon a jack so that it is vertically movable (dotted lines of Fig. 3) for the purposes of shifting weight on to and off of the side wheels and of changing the angle of attack. The longitudinal pitch and lateral tilt of the body is thereby varied, a control device such as that described heretofore being employed for that purpose. Indeed, the hand control device of this invention is ideal for automotive use inasmuch as the feet are thereby left free for throttle and brake control.

Upon take-off, the gear functions as a tricycle gear. Directional stability is maintained by ground steering until shortly before leaving the ground. After flying speed is attained, the nose is pulled up for the break-off by the tilt action of the front wheel and the machine assumes a proper take-off angle of attack. During landing, the first contact with the ground is made by the long-stroke side wheels, which may caster to the extent necessary to correct for any drift that might be present. As such, most of the vertical deceleration is absorbed before the tandem wheels engage the ground, and if the nose-high attitude is maintained, the softly sprung side wheels will also smooth out the movement over rough runways. The tail wheel is caused to touch ground soon after the outrigger wheels touch ground. If any drift is present, the relatively non-pivoting tail wheel tends to turn the airplane into the drift, thereby providing a stabilizing action. Subsequently, as the nose wheel is brought down, full steering control is obtained. The tail wheel support, of course, would be designed to withstand any side thrust encountered.

It is to be observed that this system provides positive control over pitch and roll during the critical transitional period in take-off and in landing when the vehicle picks up partial but incomplete aerodynamic control. The pilot thereby is afforded an unprecedented feeling of security, quite in contrast to the insecure feeling experienced in conventional airplanes during the transition from surface travel to flight and from flight to surface travel.

During highway driving, the nose is raised and most of the weight is on the tandem wheels. In entering a turn, the machine is banked to a proper degree (by means of the side wheels), whereupon the machine will automatically tend to turn at the proper radius; however, appreciating that the exact bank may not necessarily be made, any additional corrections to the turn may be made with the normal steering control (steering of the front wheel). If a particularly rough road is encountered, the ride may be softened by nosing down the machine thereby to shift more of the weight to the softer outrigger wheels. In addition, the feel of the steering will vary with the attitude, being most sensitive in the nose-up attitude when most of the weight is on the tandem gear. The feel of the banking control will be most sensitive in the nose-down attitude.

Referring now to Fig. 5, the front wheel 47 is carried upon a strut assembly 51, which includes shock-absorbing and elevating mechanism to be described. An open-bottomed cylinder 53 is fixed upon the body fuselage 55 by a head connection 57 and a lower clamp 59. Within the cylinder there is a hollow piston 61, the head 63 of which has a nose 65. This nose may pivotally seat in an inlet port 67 in the head 69 of the cylinder. The cylinder 53 and piston 61 provide for extending and retracting the ground wheel 47, thereby to change the longitudinal attitude of the vehicle on ground.

The lower end of the hollow piston 61 is guided through a bottom fitting 71 on the fixed cylinder and itself has a bottom fitting 73. A column 75 is then telescoped within the piston 61, and a spring 77 is interposed between their respective heads 79 and 63. Shock-absorbing action is thus provided. It will be understood, however, that an air-oil shock system could be used in place of the spring 77, or a combination of the two could be employed, these details being known in the art.

The ground wheel 47 is carried on the column 75 and a steering system is provided as follows. A torque-transmitting scissors 81 is connected at one end to the lower part of the column 75 and at its other end to a collar 83 journaled on the lower part of the cylinder 63 below the clamp 59. This collar 83 is then coupled to the hand control, as by a pair of opposed spokes 85 to which steering cables 11 are attached. In other words, the steering cables shown in Fig. 5 are part of the cable system 11 shown in Figs. 2 and 3. The ground wheel 47 is turned to steer the vehicle by manipulation of the cables 11, which turn the collar 83. Of course, other steering controls will occur to those skilled in the art.

To raise and lower the ground wheel 47, there is provided a control valve 87. This valve comprises a casing 89 to which hydraulic lines are attached. The cylinder port 67 is connected by a line 91 on one side of the casing 89. Pressure and return lines 93 and 95, respectively, are connected to the other side of the casing 89. Slidably received within this member is a valve body 97 which is provided with suitable ports as indicated. A recessed plunger 99 is then telescoped within the valve body to open and close the valve. The plunger 99 is connected by a valve stem 101 and by a control link 103 to pitch-control cables 6. As these cables are actuated, the plunger 99 is moved to uncover either the pressure port 93 or the return port 95 to lower or raise the ground wheel.

It will be observed that the sliding valve body 97 is coupled at 105 to a follow-up link 109 pivoted at one end 111 upon the frame 55. The other end of this link 109 is pivotally connected to the lower fitting 73 on the hydraulic piston 61. Therefore, as the wheel is lowered by the hydraulic system, the valve body 97 is also moved.

In operation, when the control link 103 is moved to a nose-up position, the pressure port 95 is uncovered to admit fluid to the cylinder 53. As the piston 61 responds by downward movement, this downward movement is communicated through the follow-up link 109 to the valve body 97, so that flow of fluid is cut off after a predetermined movement of the valve body relative to the plunger 99. Consequently, the angular position of the cable-driven link 103 determines the position of the ground wheel 47 relative to the body. Additionally, a conventional manual control valve 100 might be connected in the cylinder line 91 to vary the rate of flow or control response, or to isolate and lock the nose wheel in position.

Reference is now made to Figure 6 for the details of a side strut assembly 151. Only the right strut is shown, but it will be understood that the left strut is identical. It should also be understood that the details of these struts are merely by way of illustration, as there are, of course, a number of variations to the disclosed forms.

In the embodiment shown in Figure 6, a cylinder 153 is slidably and rotatably carried within an annular guide 155, which is fixed upon the fuselage 55. A wheel-carrying tube 157 is arranged in telescoping relationship within the open-bottom cylinder 153 and is guided by a lower fitting 159 on the cylinder and by an upper fitting 161 on the tube. A shock-absorbing spring 165 is interposed between the head 163 of the cylinder 153 and the upper fitting 161 of the wheel-supporting tube. This spring 165 should be relatively long to provide for a long stroke or large deflection suitable for landing gear. If desired, an air-oil shock arrangement might also be used either as a substitute for or in combination with the spring 165.

To provide for raising and lowering of the side wheels 46, a member 167 is fixed at its top to the fuselage and enters through an opening 169 in the cylinder head 163. An inner cylinder 171 depends from the head 163, this cylinder 171 being closed at its bottom by a fitting 173, which may have a nose 175 cooperable with a hydraulic port 177 extending through the fixed member 167. As shown, this member 167 also has a head 179 cooperating with the side walls of the inner cylinder 171. The wheel may be raised and lowered relative to the body by releasing or admitting hydraulic fluid through the port 177.

The hydraulic action is controlled by a valve 181, which comprises a casing 183 to one side of which are connected lines 184 and 185. The line 184 leads to the right strut and the line 185 leads to the left strut. To the other side of the casing there are connected pressure lines 189 and a central return line 187.

The casing contains a fixed valve body 191, and an apertured sleeve 193 is rotatably received within the valve body. The sleeve is provided with circumferentially disposed sets of varying sized orifices 195, which can be selectively exposed to ports 197 in the valve body by rotating the sleeve, thereby to control the rate of flow through the valve. A sleeve actuating arm 199 is attached to one end of the sleeve for this purpose. Where it is desired to duplicate flight conditions, a follow-up valve-closing system would not be used, but one can be provided, if desired, by making the valve body 193 axially movable and connecting it to one of the wheels as illustrated at 305, 309 and 311 in Fig. 7. Also, it will be understood that there could be two valves of the type shown in Fig. 5, each actuated by the link 207 to operate in opposite directions and each controlling a side wheel in the same manner as the Fig. 5 valve controls the nose wheel.

The valve is opened and closed by manipulation of a plunger 201 having recesses 203 spaced therealong. A valve stem 205 is connected through a pivoted link 207 to tilt-control cables 13. These cables form a part of the aileron-control cable system mentioned heretofore.

Operation is as follows: As the plunger 201 is moved downwardly, the pressure line 189 is uncovered and connected to the line 183 for the right strut, and the line 185 for the left strut is then placed in communication with the return line 187. Fluid is thereby admitted into the right strut and returned from the left strut so that the vehicle is banked to the left. The response to control is variable. Should the plunger be moved only a small amount, only a few of the sleeve orifices 195 are uncovered and flow is restricted. As the plunger is moved farther the rate of flow is increased. When the sleeve 193 is rotated, it may bring into action a different set of orifices, giving a different rate of flow, or the flow may be closed off entirely, or a bleed back from the return line to both cylinders may be established. This bleed back would be used to permit the side wheels to retract together in landing after the shock of ground contact has been largely absorbed so that the vehicle settles down upon the tandem wheels for directional control.

Considering the operation of the undercarriage on take-off, the aircraft is conveniently and precisely taxied and steered down the runway by means of the front wheel, without danger of ground looping, either horizontally or vertically, as when the brakes are applied. The rear drive wheel not only affords a more positive control on the ground, but in combination with a suitable coupling would aid in attaining flying speed more quickly, thereby permitting shorter take-offs. Cross winds are no great problem because the vehicle may be wheel-banked as necessary until sufficient speed is attained for response to aileron control. During the take-off run, the nose wheel is maintained in its mid positon of vertical adustment so that full steering control is had while flying speed is built up. Then, as the pilot's control is manipulated to increase the angle of attack for break-off, the nose wheel is advanced to aid the action of the stabilizer. As such, the arrangement offers the aerodynamic advantages of the conventional gear without the loss of steering, and the steering advantages of tricycle gear without its difficulty in getting the nose up.

The single-acting hydraulic jacks at the side wheels also offer a means of increasing the angle of attack on take-off, assuming that the side wheels are forward of the center of gravity. With the inlet and outlet valve ports somewhat restricted, the aileron control would develop a pumping effect. In other words, high pressure flow into one of the cylinders would be greater than the flow out of the other cylinder. Consequently, the side wheels may be jacked down and the nose jacked up by a manipulation of the valve in the same way the ailerons are manipulated in normal flight procedure when it is desired to obtain a high angle of attack for a short take-off. This effect, however, is not always desirable, and in automotive vehicles it may be better to employ double-acting cylinders so that the steering nose wheel cannot be accidentally lifted off the ground, or it may be desirable to have different control responses for normal automotive use and aircraft take-off and landing. A device such as the sleeve 191 of Fig. 6 might be used to vary the response of the side jacks for different conditions.

As the vehicle leaves the ground, the two side wheels and the front wheel automatically lower as the valves open in response to normal control actions. It will be noted the single-acting hydraulic system causes the wheels to drop their full amount whether the cylinders are opened to the return or to the pressure lines. Once the wheels are so extended, the hydraulic system is inactive until load is again applied to the wheels on touch-down.

In landing, almost any technique may be safely adopted. Indeed, the pilot need only be concerned with hitting the runway and can devote his primary attention to directional control (as by use of the hand-control device herein described for steering and by use of foot-operated flaps or air brakes for varying the rate of descent). The fully-extended side wheels with their soft shock absorbers permit near stall three-point landings onto the two side wheels and tail wheel, the weight then settling onto the steerable nose wheel for good directional control. It will be understood, the valve control sleeve 193 may be designed and adjusted to permit the proper rate of bleed-back from both side-wheel cylinders for proper settling, while the valve member 201 permits rolling the vehicle should correction against cross winds be necessary.

In glide-on or fly-on landings made at a near level attitude, the side wheels caster freely to allow the plane to continue on path, settling onto the tail wheel at first, which inherently straightens out any drift or yaw present, and then onto the nose wheel for steering control. In contrast to conventional gear, the center of gravity obviously is ahead of the non-castering tail wheel, hence the possibility of ground looping horizontally is prevented, and the nose wheel prevents tip-over if the brakes are applied heavily.

In the case of roadable aircraft, the wings may be folded back without loss of stability, the propeller disconnected, and drive had through the rear wheel. Normally, the principal highway loads are carried on the nose and tail wheels, which are fitted with brakes and with shock-absorbing actions best suited for road travel. Less road shock is transmitted to the body and the long wheel base of the tandem wheels minimizes longitudinal pitch. The tandem wheels are firmly held to the road surface, yet when a bump is encountered and the nose or tail is lifted, part of the weight is momentarily transferred to the side wheel springs as the body sinks down. Part of the settling load is thereby absorbed so that a damping effect is achieved which further improves roadability.

At normal speeds, the side wheels transfer little shock to the body, because they do not carry much of the weight but serve to stabilize and bank the body. Of course, the nose steering wheel permits sharp turns or cross-control, when necesasry. When speed is reduced, the nose wheel may be retracted somewhat and more weight transferred to the side wheels to afford greater stability since the braking and drive traction need not then be as great.

Considered from the point of view of pre-flight training, the action of the undercarriage approximates that of flight. In making a banked turn, the centrifugal force effect will compress the front wheel spring and dip the nose (center of gravity forward) so that back pressure on the control is desirable in proportion to the speed and degree of bank. In flight the same tendency is present although the dip is caused by reduction of lift, and back pressure on the control is required in the same manner.

Present day flight training theory prefers that the stabilizer be looked upon as an angle of attack control for varying the flight conditions. In the same way, the nose wheel can be considered a longitudinal tilt control for varying the characteristics of the ride. The driver necessarily learns to bank as he turns the nose wheel to go into a turn on a road, much as the pilot should learn to use his rudder and ailerons in coordinated fashions in making turns in flight. It may even be noted the vehicle will go into a turn when banked with nose wheel unturned, because the center of gravity is shifted to one side so that the side wheels are unevenly loaded and create an uneven drag effect. This drag effect will necessarily vary with the degree of bank or the load on the particular side wheel. Consequently, cross-control may also be learned. With double-acting cylinders, the drag effect developed against the inertia of the vehicle as a side wheel is extended can even be made to simulate the yaw effect occurring when an aileron is depresesd. For such training purposes, it may be necessary to have a slight brake action applied to the side wheels, either permanently or whenever they are moved from neutral. To generalize, such a pre-flight trainer will familiarize the student pilot with the directional controls, and to some extent, with the importance of the angle of attack in determining flight conditions.

In summary, it will be apparent that the undercarriage arrangement herein disclosed offers many advantages, among which are a more efficient undercarriage for roadable aircraft, a safer undercarriage for aircraft in general, a duplication of flight conditions during road travel, such being desired in sports cars and for pre-flight training, and in particular, to secure the utmost in the benefits and advantages of the control device described in connection with Figs. 1 and 2. The undercarriage makes it practical to fold the wings and carry them along, yet retain proper longitudinal and lateral balance while driving on roads at normal automobile speeds. The driver is afforded an unprecedented feeling of stability and mastery of the vehicle on the ground as the handling and riding qualities thereof are not attainable with conventional undercarriages.

A more efficient body and frame design for automotive vehicles is permitted, since the frame can be made with a single longitudinal center beam and a single cross beam at or near the longitudinal center of gravity. There may be brakes only on the tandem wheels, hence braking thrust is then only applied to the longitudinal beam. This beam also absorbs all of the drive and turning thrust, whereas the transverse beam need handle only balancing forces. In the case of aircraft, however, the transverse beam will also take up substantial landing shock forces.

Although one complete embodiment of the invention has been disclosed in detail, it is to be understood that the invention is not limited thereto, but the drawings and description are to be understood as being merely illustrative. Whereas, the various features of the invention are considered collectively desirable in roadable aircraft, it is foreseen that only some of the features may be used, particularly in other types of vehicles. For example, the hand control device of this invention may be employed in speed boats equipped with banking means, such as fins, or in automotive vehicles, particularly sport cars, with three or four wheels, or in aircraft for manipulation of only the aerodynamic control surfaces, or in helicopters. In a like manner, the undercarriage of this invention may be operated by more conventional control devices, and the principles thereof utilized in part only. For example, the longitudinal and lateral tilt features may be entirely omitted, or only one axis of tilt employed, or a different wheel placement employed.

Whereas the single-acting hydraulic jacks are preferred from the point of view of simplicity and pressure failure, it is contemplated that a double-acting arrangement may be preferred in some applications. It is also to be noted that the control valve arrangement may differ from that described, and that other types of struts or wheel supports may be used, although the disclosed form of combination jack and shock absorber offers the advantages of simplicity and light weight.

It is appreciated that many modifications and variations will present themselves to those skilled in the art without departing from the spirit of this invention or the scope thereof as set forth in the appended claims.

Having thus described the invention, what is claimed and desired to be secured by Letters Patent is:

1. In a vehicle, an operator's control device coupled to the directional controls of the vehicle, the device comprising a primary wheel mounted for rotation, a shaft arranged concentric with the rotary axis of said wheel and rotatable independently thereof, a secondary control element rotatably attached to said wheel in axially offset relationship, a handle on said secondary control element, and a coupling between said shaft and said secondary control element, said coupling being constructed and arranged to rotate the shaft and said secondary element in the same direction.

2. An operator's control device as set forth in claim 1, comprising a first gear secured upon said shaft adjacent said wheel, an idler pinion carried by said first wheel in mesh with said first gear, and a second gear rotated by said handle, said second gear being in mesh with said idler pinion.

3. An operator's control device as set forth in claim 1, wherein said second control element comprises a second wheel mounted within said first wheel in co-planar axially offset relationship, said second wheel having a handle-forming cross arm extending generally diametrically across said second wheel, said handle-forming cross arm being readily accessible to permit rotation of the second wheel independently of the first wheel by twist thereof and to permit rotation of the primary wheel by lateral movement of the second wheel.

4. An operator's control device as set forth in claim 1 further comprising a manually operated lock for rigidly coupling the two rotary elements together.

5. An operator's control device as set forth in claim 1 further comprising a lost-motion connection between the primary and secondary rotary control elements.

6. In an aircraft having a rudder, ailerons and a predetermined cruising speed, an operator's control device comprising first and second concentric shafts rotatably coupled respectively to the rudder and ailerons to actuate them, a primary wheel fixed to one of said shafts, a second control element rotatably carried by said primary wheel in axially offset relationship, said second control element having a readily accessible handle, a connection between said other shaft and said second control element so constructed and arranged as to cause the two to rotate together in the same direction, the coordination between the rudder, ailerons and the respective shafts being constructed and arranged to provide a normal bank when the rudder is turned with the secondary control element fixed relative to the primary wheel during cruising conditions, but permit abnormal banks by movement of secondary control element relative to the primary wheel when desired.

7. The combination set forth in claim 6 wherein the secondary control element and its associated shaft carry gear surfaces and are connected together by interposed idlers.

8. The combination set forth in claim 6 further including a manually-actuated lock for locking and unlocking the secondary element to and from the primary wheel.

9. In a vehicle, a pair of tandem ground wheels arranged generally upon the longitudinal axis of the vehicle, a pair of side ground wheels arranged generally at the transverse axis of the vehicle, resilient mounting for the tandem wheels, one of which is steerable and resilient mountings for the side wheels, the resilient mountings for the side wheels being relatively softer and having a relatively longer deflection than those of the tandem wheels.

10. A vehicle as set forth in claim 9, wherein the resilient mounting for one of the tandem wheels includes a jack for moving the associated wheel vertically, thereby to vary the proportion of the weight of the vehicle carried on the side wheels.

11. A vehicle as set forth in claim 10, wherein said jack is hydraulic and has relatively fixed and movable hydraulic elements, and a control valve having first and second movable control elements each of which is effective to control flow of hydraulic fluid to the jack, one of said control elements being a primary control for initially opening the valve and the other control element including a linkage by which it is connected to the movable hydraulic element for actuation thereby to close the valve after predetermined movement of the movable hydraulic element in response to opening of the valve by said first control element.

12. In a vehicle having a pair of tandem ground wheels and a pair of balancing side wheels; hydraulic jacks supporting each of the side wheels, and a control valve having a control element movable from a neutral valve-closed position in opposite directions, said valve having ports opened and closed by said control element, said ports being arranged to supply hydraulic fluid to one of the jacks and drain the other jack in response to movement of the control element in one direction and vice versa, at least two of said ports being constituted by a plurality of orifices arranged to be sequentially opened to vary the flow of hydraulic fluid to and from the jacks in accordance with the movement of said control element.

13. In a vehicle having a pair of tandem ground wheels and a pair of balancing side wheels; hydraulic jacks supporting each of the side wheels, and a control valve having a control element movable from a neutral valve-closed position in opposite directions, said valve having ports opened and closed by said control element, said ports being arranged to supply hydraulic fluid to one of the jacks and drain the other jack in response to movement of the control element in one direction and vice versa, a rotary valve control sleeve interposed between said control element and said ports, said rotary sleeve having at least two different sets of openings either of which is selectively exposable to said ports for changing the rate of flow to and from the hydraulic jacks.

14. A vehicle comprising a body, a pair of tandem ground wheels, one of which is mounted upon a pivotal support for steering the vehicle, a pair of resiliently-supported castering wheels mounted at the sides of the body to provide lateral support, pitching gear coupled to one of the tandem wheels for moving it vertically relative to the body, said other tandem wheel being fixed with respect to movement in a vertical direction relative to the body, and an operator's control device coupled to said steerable tandem wheel to control movement about a vertical axis, said operator's control device also being coupled to said pitching gear to control the proportion of weight carried by said resiliently-supported side wheels.

15. A vehicle comprising a body, a pair of tandem ground wheels, one of which is mounted for pivotal support for steering the vehicle, a pair of resiliently-supported castering wheels mounted at the sides of the body providing lateral support, rolling gear coupled to said side wheels for moving them vertically relative to the body in opposite directions to roll the body, and an operator's control device coupled to both said steering gear and said rolling gear.

16. A vehicle as set forth in claim 15, wherein said operator's control device comprises a wheel rotatably coupled to said pivotal support for steering the vehicle, said wheel having a second control element rotatably attached to said wheel in axially-offset relationship, said second control element having a handle and being rotatably coupled to said rolling gear to control the lateral tilt of the body.

17. A vehicle as set forth in claim 15, further including pitching gear coupled to one of the tandem wheels for moving it vertically relative to the body, said other tandem wheel being fixed with respect to movement in a vertical direction relative to the body, and said operator's control device being coupled to said pitching gear to control the proportion of weight carried by said resiliently-supported side wheels.

18. A vehicle as set forth in claim 1 further having a body, steering gear for steering the body about a vertical axis and rolling gear for turning the body about a longitudinal axis, said primary wheel being coupled to actuate one body-controlling gear and said secondary control element being coupled through its shaft to actuate the other body-controlling gear.

19. A vehicle as set forth in claim 18, wherein said primary wheel is coupled to actuate said steering gear and said secondary control element is coupled to actuate said rolling gear.

20. A vehicle as set forth in claim 18, further including ground wheels at least one of which is steerable and two of which are laterally spaced and vertically movable to control roll of the body, said steerable wheel being actuated by said steering gear and said laterally-offset vertically-movable wheels being actuated by said rolling gear.

21. A vehicle comprising a body having longitudinally and laterally spaced ground wheels for surface travel, steering gear for one of the wheels, pitching gear for moving one of the wheels vertically relative to another longitudinally spaced wheel, rolled gear for moving one of the wheels vertically relative to another laterally spaced wheel; and an operator's control device mounted on the vehicle for manipulation by an operator, said control device having a wheel mounted for axial and rotary movement, said wheel being rotatably coupled to the steering gear and coupled with regard to the axial movement to the pitching gear, and a second control element rotatably attached to said wheel in axially offset relationship, said second control element having a handle and being rotatably coupled to said rolling gear independently of said steering gear and pitching gear.

22. A vehicle comprising a body constructed for surface travel and flight, steering gear comprising a rudder and a ground wheel mounted at the front of the body upon a pivotal support, pitching gear comprising an elevator and means for moving said front pivotal support vertically relative to the body, rolling gear comprising ailerons and side wheels movable vertically relative to the body in opposite directions; and an operator's control device mounted on the body for manipulation by an operator, said control device having a wheel mounted for axial and rotary movement, said wheel being rotatably coupled to the steering gear and coupled with regard to axial movement to the pitching gear, and a second control element rotatably attached to said wheel in axially offset relationship, said second control element having a handle and being rotatably coupled to said rolling gear independently of said steering gear and pitching gear.

23. In a vehicle having directional controls, an operator's control device coupled to the directional controls comprising a primary wheel mounted for rotation about an axis, a shaft arranged concentrically with the rotary axis of said wheel and rotatable independently thereof, a secondary control element rotatably attached to said wheel in offset relationship to the axis of the wheel, a handle on said secondary control element, and a coupling between said shaft and said secondary control element so that said shaft is actuated by rotation of said secondary control element about its axis or by rotation of said wheel with said secondary control element held against rotation about its axis.

24. In a vehicle having laterally spaced side wheels mounted for vertical movement relative to one another, a jack for moving one of said wheels vertically, and a control device having first and second control elements each of which is effective to control operation of the jack, one of said control elements being a primary control for energizing the jack and the other control element including a linkage by which it is connected to the wheel for actuation thereby for de-energizing the jack after predetermined vertical movement of said wheel.

References Cited in the file of this patent

UNITED STATES PATENTS

| | | |
|---|---|---|
| 1,151,685 | Hulbert | Aug. 31, 1915 |
| 2,110,516 | Weick | Mar. 8, 1938 |
| 2,386,709 | Osborn | Oct. 9, 1945 |
| 2,448,064 | Wallace | Aug. 31, 1948 |
| 2,483,027 | Van Zelm | Sept. 27, 1949 |

FOREIGN PATENTS

| | | |
|---|---|---|
| 506,528 | Great Britain | May 30, 1939 |
| 819,026 | France | June 28, 1937 |